United States Patent [19]
Asghar

[11] Patent Number: 5,379,388
[45] Date of Patent: Jan. 3, 1995

[54] DIGITAL SIGNAL PROCESSING APPARATUS WITH SEQUENCER DESIGNATING PROGRAM ROUTINES

[75] Inventor: Safdar M. Asghar, Austin, Tex.

[73] Assignee: Advanced Micro Devices, Inc., Sunnyvale, Calif.

[21] Appl. No.: 910,699

[22] Filed: Jul. 8, 1992

[51] Int. Cl.$^6$ .......................... G06F 9/00; G06F 9/06
[52] U.S. Cl. .................................. 395/375; 395/800; 364/232.8; 364/262.4; 364/DIG. 1
[58] Field of Search ............... 395/800, 775, 650, 425, 395/375

[56] References Cited

U.S. PATENT DOCUMENTS

| | | | |
|---|---|---|---|
| 4,763,252 | 8/1988 | Rose | 345/168 |
| 4,879,678 | 11/1989 | Kurokawa et al. | 395/775 |
| 4,884,196 | 11/1989 | Thiel et al. | 395/425 |
| 5,218,712 | 6/1993 | Cutler et al. | 395/800 |

Primary Examiner—Alyssa H. Bowler
Assistant Examiner—Alpesh M. Shah
Attorney, Agent, or Firm—Foley & Lardner

[57] ABSTRACT

A digital signal processing apparatus which employs a ROM-stored library of predetermined instructions which are user-accessible via a sequencer for execution as a program of instructions. The apparatus preferably may also include an instruction RAM which is user-programmable to supplement the prestored instructions in the on-board instruction ROM.

8 Claims, 3 Drawing Sheets

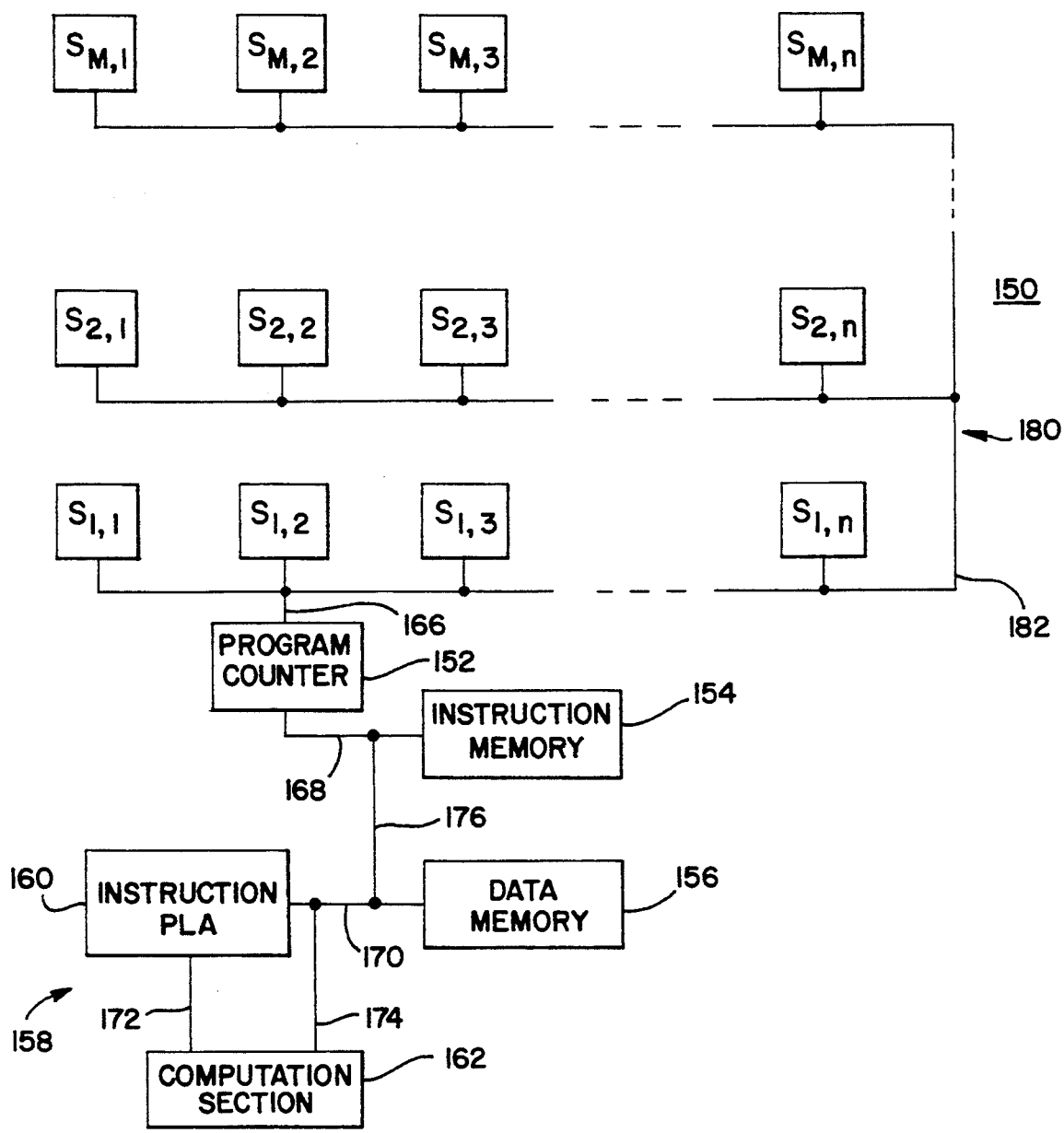

DIGITAL SIGNAL PROCESSING APPARATUS WITH SEQUENCER DESIGNATING PROGRAM ROUTINES

BACKGROUND OF THE INVENTION

The present invention is directed to a digital signal processing apparatus. In particular, the present invention is directed to a digital signal processing apparatus which is amenable to user-defined program routines.

Prior art general purpose digital signal processing apparatuses typically comprise a program memory in a read-only memory (ROM) structure, a program counter which drives the program memory, a data memory in a random-access memory (RAM) structure for storing partial results, a coefficient memory in ROM structure for storing prestored constants, and a computational section generally consisting of a programmed logic array for establishing predetermined logical relationships, an arithmetic logic unit (ALU), an accumulator, a multiplier, and a shifter.

There are certain problems associated with such prior art general purpose digital signal processing apparatuses. In particular, programs resident in the program memory (ROM) in such apparatuses are designed for particular applications or targeted to run a particular machine or function. Any changes to the resident program of such prior art digital signal processing apparatuses can only be made by a total rewrite of the program stored in ROM in machine language.

Generally, the steps involved in designing a digital signal processing apparatus from the outset include a simulation or modelling of the particular program to be implemented by the apparatus; such modelling is conducted using a high-level computing language. That is, a computing language which employs commands which are translated by a program into machine-level language, which machine-level language is acted upon by a computing apparatus. Machine-level language generally has little resemblance to high-level language. The expression of the program in machine-level language is necessarily tedious and, therefore, affords increased opportunities for error during the translation to machine language from high-level language. Such increased opportunities for error give rise to system "bugs"; valuable time is necessarily expended in ascertaining the source of the "bugs" and drafting new machine language code to fix the problems discovered.

Once the correct machine language has been determined, an outside independent source is usually employed to consult, assist in design, assist in manufacturing, and test the program setup in anticipation of manufacturing the required apparatus. Such apparata are usually implemented in a plurality of masks for combining into an integrated circuit in a wafer form for mass production. Significant front-end costs are thus usually incurred before one begins to realize an income stream from sale of the apparatus. If system or program bugs are not discovered until after the masking process is complete, then the chip or wafer must be rejected and the process returns to the design stage or the translation (to machine-level language) stage in order that "debugging" may continue and the processing may be repeated through the manufacturing stages. Chips are almost never reworkable and must be discarded, resulting in sometimes significant non-recoverable engineering and manufacturing costs. If it is decided to change the program solution and, consequently, change the machine coding implementing the programs, the same cost impact is encountered as would be encountered in the case of a late-discovered mistake. Thus, such prior art digital signal processing apparata discourage innovations which could be implemented but which require even minor program changes.

Cost is not the only significant factor in considering the problems with designing or reprogramming prior art digital signal processing apparata. The time involved in fabricating a newly-designed digital signal processing apparatus is generally on the order of about three months. Reprogramming and generating new masks to correct a problem or to implement an improvement can take around six weeks to complete. Such time delays can result in significant opportunity costs in lost sales in a volatile competitive market such as today's electronic systems market.

Some efforts have been made to render a digital signal processing capability more amenable to real-world needs of timely and forgiving manufacturing processes. For example, EPROM (erasable programmable read-only memory) devices have been introduced. Such EPROM devices have utility as prototype ROM devices and are principally used for testing machine-level language being developed for a digital signal processing apparatus prior to sending the machine code for implementation in masks in an integral device. An advantage of digital signal processing apparata such as the apparatus of the present invention is their small size, their speed of operation, and their low cost. EPROM devices are too large, too slow, and too expensive for widespread use with digital signal processing apparata in applications of the type contemplated by the present invention.

Therefore, there is a need for a digital signal processing apparatus which is amenable to cost-effective, timely changes in the programming instructions to be implemented by the apparatus. It is desirable that such an improved digital signal processing apparatus employ an on-board instruction ROM in order to realize the benefits of increased speed of operation available to such integral devices.

SUMMARY OF THE INVENTION

The present invention is a digital signal processing apparatus which employs a ROM-stored library of predetermined instructions which are user-accessible via a sequencer. The apparatus preferably may also include an instruction RAM which is user-programmable to supplement the prestored instructions in the on-board instruction ROM.

Specifically, the present invention is a digital signal processing apparatus for executing a program which is comprised of an ordered schedule of instructions. The apparatus preferably comprises an instruction memory for storing a predetermined library of instructions comprising a plurality of instructions, each of which instructions in the library has an address. A sequencing unit is operatively connected with the instruction memory for defining the program, and the sequencing unit is responsive to an input device for designating appropriate respective addresses of instructions to establish the ordered schedule appropriate to define the program. An instruction executing unit for executing the ordered schedule of instructions receives the ordered schedule of instructions from the instruction memory.

Preferably, the present invention is embodied in an integral structure and incorporates an instruction memory which includes a first instruction memory for storing instructions in a read-only memory (ROM) structure and a second instruction memory for storing instructions in a random-access memory (RAM) structure. The second memory is responsive to an input device to receive user-generated instructions directly from the input device for storage and use in the library of instructions available for defining the program.

It is, therefore, an advantage of the present invention to provide a digital signal processing apparatus for executing a program which provides a predetermined library of instructions available for designation by a user to define a program for execution by the apparatus.

It is a further advantage of the present invention to provide a digital signal processing apparatus for executing a program which provides a user-driven sequencing device for running program routines which are defined by the sequencing device as ordered schedules of instructions selected from among instructions contained in the instruction library which is stored in a read-only memory.

It is yet a further advantage of the present invention to provide a digital signal processing apparatus for executing a program which includes a first instruction memory for storing instructions comprising a library of instructions in a read-only memory structure and a second instruction memory for storing instructions in a random-access memory structure, which second memory is amenable to receiving user-generated instructions for storage and use in the library of instructions.

Further objects and features of the present invention will be apparent from the following specification and claims when considered in connection with the accompanying drawings illustrating the preferred embodiment of the invention.

BRIEF DESCRIPTION OF THE DRAWINGS

FIG. 3 is a schematic block diagram of an alternate embodiment of the present invention.

DETAILED DESCRIPTION OF THE INVENTION

Figure 1:
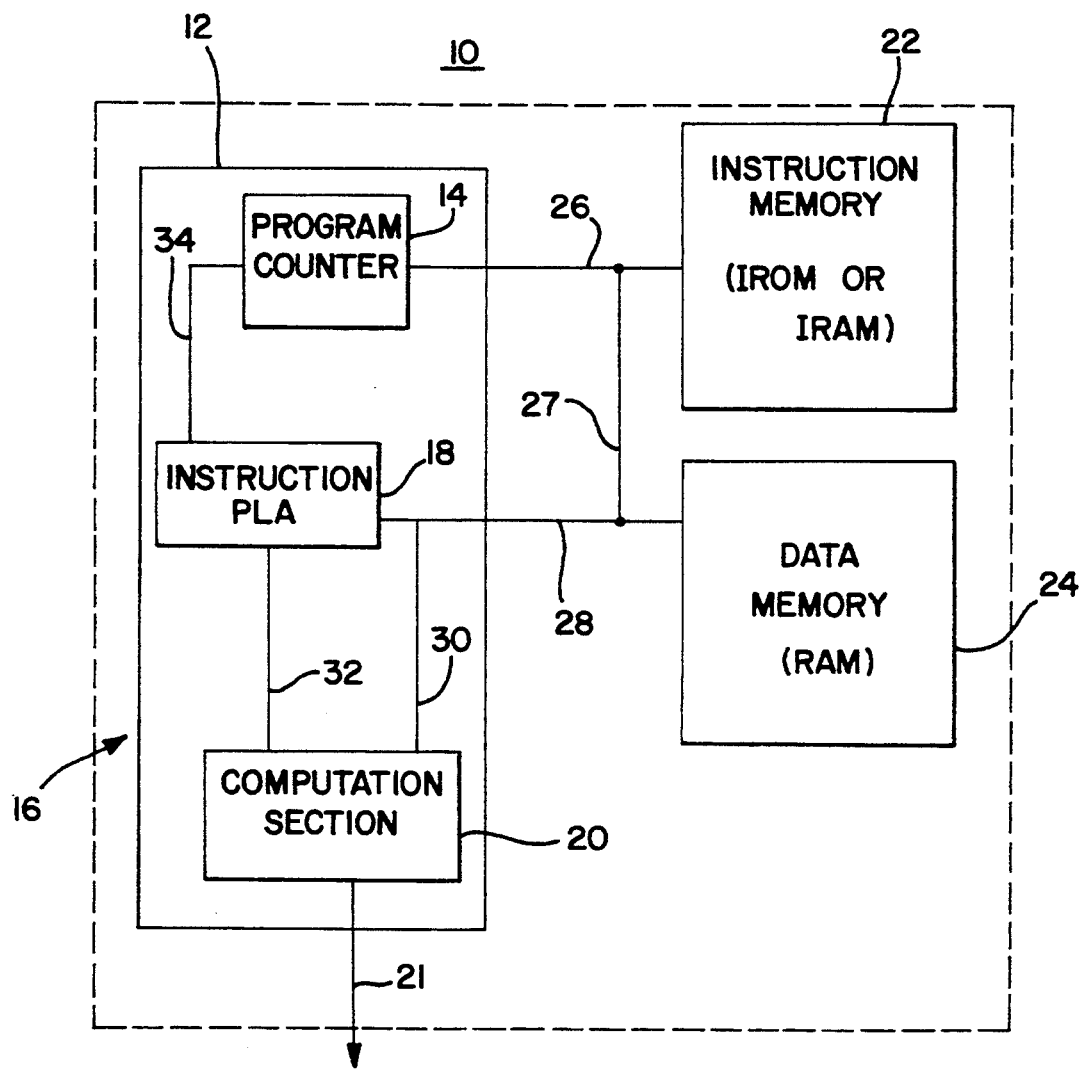
FIG. 1 is a schematic block diagram of a prior art digital signal processing apparatus.

FIG. 1 is a schematic block diagram of a typical prior art digital signal processing apparatus. In FIG. 1, a digital signal processing apparatus 10 is illustrated comprising a digital signal processing engine 12 which includes a program counter 14, and an execution unit 16. Execution unit 16 includes a programmed logic array 18 and a computation section 20. Computation section 20 typically includes such units as an arithmetic logic unit, an accumulator, a multiplier, and a shifter (not shown).

Digital signal processing apparatus 10 further includes an instruction memory 22 and a data memory 24. Instruction memory 22 may be in either a read-only memory (ROM) or a random-access memory (RAM) structure; data memory 24 is usually in a random-access memory (RAM) structure. Additional storage units, such as a coefficient memory, are also usually included, but are omitted here in order to simplify understanding of the present invention. Instruction memory 22 is operatively connected with program counter 14 via an instruction bus 26. Data memory 24 is operatively connected with programmed logic array 18 via a data bus 28 and is operatively connected with instruction memory 22 via a connecting bus 27. Computation section 20 is connected with data bus 28 via a secondary data bus 30 and is operatively connected with programmed logic array 18 via a secondary instruction bus 32. Program counter 14 is operatively connected with programmed logic array 18 via a program bus 34.

In the prior art apparatus illustrated in FIG. 1, instructions are stored in instruction memory 22 in a program comprising a predetermined sequence of individual instructions, each individual instruction having a respective unique address within instruction memory 22. For example, if a given function (e.g., a fast Fourier transform algorithm) is to be performed twice in the program contained in instruction memory 22, the expression for a fast Fourier transform, embodied in its respective required instructions for performance of such a function, must be expressed twice. That is to say, program counter 14 effects a sequential addressing of individual instructions of a program within instruction memory 22, keeping track of the respective beginning addresses for each individual instruction, and conveys that instruction via instruction bus 26 and program bus 34 to programmed logic array 18.

Programmed logic array 18 imposes certain predetermined logical relationships upon received instructions and conveys a programmable logical output to computation section 20 via secondary instruction bus 32. Computation section 20 performs mathematic or other logical functions in response to the received programmed logical output to ultimately generate an output at line 21. Computation section 20 may, as an interim step, generate partial results which are conveyed via secondary data bus 30 and data bus 28 for storage in data memory 24 or for storage in instruction memory 22 via connecting bus 27 and instruction bus 26. Such stored partial results may be accessed by program counter 14 for provision to programmed logic array 18 or may be provided directly to programmed logic array 18 via data bus 28.

Figure 2:
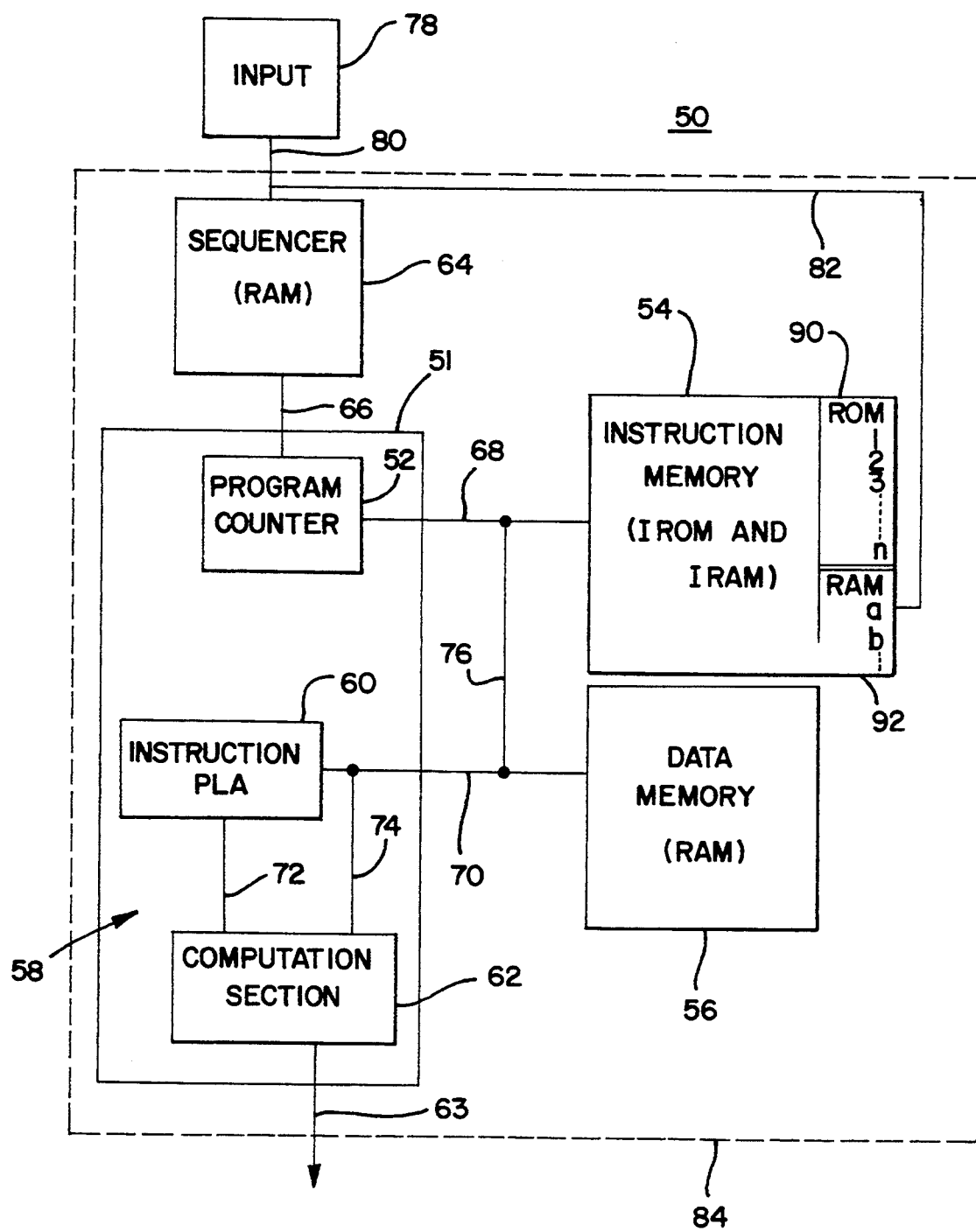
FIG. 2 is a schematic block diagram of the preferred embodiment of the present invention.

FIG. 2 is a schematic block diagram of the preferred embodiment of the present invention. In FIG. 2, an improved digital signal processing apparatus 50 is illustrated as including a digital signal processing engine 51, an instruction memory 54, and a data memory 56. Digital signal processing engine 51 includes a program counter 52 and an execution unit 58. Execution unit 58 includes a programmed logic array 60 and a computation section 62. Also included in improved digital signal processing apparatus 50 is a sequencer 64.

Sequencer 64 is operatively connected with program counter 52 via a sequencing bus 66 and program counter 52 is operatively connected with instruction memory 54 via an instruction bus 68. Program logic array 60 is operatively connected with data memory 56 via a data bus 70. Computation section 62 is operatively connected with programmed logic array 60 via a secondary instruction bus 72 and is operatively connected with data bus 70 via a secondary data bus 74. Buses 68, 70 are interconnected via a connecting bus 76.

Sequencer 64 is responsive to an input device 78 which may be in the form of a user-controlled keyboard, or other data input device. Input data are supplied to sequencer 64 via a connection 80 appropriate for the respective input device 78 which is employed. Input device 78 is also operatively connected with instruction memory 54 via an appropriate connection 82.

In the preferred embodiment of the present invention illustrated in FIG. 2, improved digital signal processing apparatus 50 is embodied in an integrated circuit on a single substrate 84.

Three significant differences exist between prior art digital signal processing apparatus 10 of FIG. 1 and improved digital signal processing apparatus 50 of FIG. 2:

1. the presence of sequencer 64;
2. no connection is provided directly between program counter 52 and programmed logic array 60; and
3. instruction memory 54 is formatted and constructed differently than instruction memory 22.

Specifically, instruction memory 54 includes a read-only memory (ROM) section 90 and a random-access memory (RAM) section 92. Stored in ROM section 90 are a collection of predetermined instructions intended as a "turnkey" set of routines useful in addressing a variety of applications for which digital signal processing apparatus 50 may be employed. Examples of the types of predetermined instructions which may preferably be stored in ROM section 90 are:

a programmable lead/lag filter and integrator function;
a programmable tone generator function;
a recursive averaging filter function;
a programmable threshold comparator function;
an estimator and predictor function;
a variety of counters and functions;
special math functions, such as square root, division, and $X^n$.

RAM section 92 is connected with input device 78 via connection 82 in order that special user-created instructions may be stored in RAM section 92 for use as custom-designed turnkey routines.

Sequencer 64 includes a RAM-type memory capability in which a user may simply specify the order of employment of the respective turnkey routines stored in ROM section 90 and RAM section 92 of instruction memory 54 merely by identifying which turnkey routines are to be executed and their order of execution. That is, sequencer 64 can store a plurality of sequenced identifiers, each of which sequenced identifiers uniquely identifies one turnkey routine stored in ROM section 90 or RAM section 92, and the complete set of sequenced identifiers stored in sequencer 64 constitutes a program for execution by digital signal processing apparatus 50. This scheme of employing a sequenced identifier to identify a predetermined turnkey routine effectively amounts to providing a higher-order programming capability for identifying which turnkey routine (expressed in machine language) is to be employed to effect a program. Further, should one wish to perform a given math function, for example, twice, there is no need to restate the math function in machine language; a user must merely twice specify the sequenced identifier for that math function as it is stored in instruction memory 54 (i.e., in either ROM section 90 or RAM section 92) to program the appropriate instruction for performing that particular math function. By providing such a higher-order programming capability for digital signal processing apparatus 50, one eliminates a major source of error encountered in programming such devices using prior art apparatuses such as those illustrated in FIG. 1. Further, should one (i.e., a user) wish to change a program either to correct a drafting error or to modify a program to incorporate an improvement, one merely needs to re-enter appropriate sequence identifiers in sequencer 64 to effect such a change.

Such a capability for a user to effect programming of a digital signal processing apparatus using a prestored library of instructions (in ROM section 90) and, especially, with the added facility of entering user-customized turnkey routines in memory for use as part of the library of instructions for creating programs in RAM section 92, address a long-felt need for digital signal processing apparatuses: a capability for flexible programming of such digital signal processing apparatuses which allows a user to avoid disadvantageous consequences of errors or of incorporating changes in programming. In particular, such a flexible user-specified programming capability facilitates avoidance of lost products which cannot be reworked to effect such changes, lost time in redesigning masks and other manufacturing steps preparatory to manufacturing a new custom chip, lost opportunities when, because of the aforesaid disadvantages, one avoids making changes which would otherwise be desirable, and lost time in terms of turnaround from an outside vendor for making program changes.

Sequencer 64 employs a sequencer slot memory, a user-programmable RAM that points to the start addresses for each of the instructions stored in instruction memory 54, either in ROM section 90 or in RAM section 92, without distinguishing between the two sections. Program counter 52 operates in conjunction with sequencer 64 to keep track of where in the internal structure of instruction memory 54 appropriate pointers for finding particular turnkey routines are located. Data memory 56 is primarily employed for storing partial results of execution unit 58 received via data bus 70. Data memory 56 may be also employed as a coefficient or constant RAM for storing coefficients or constants required for certain of the turnkey routines stored in instruction memory 54 to be employed by those turnkey routines as acquired. Of course, the required constants and coefficients may as well be maintained in a separate storage device (not shown). Thus, in response to sequencer 64, and as tracked by program counter 52, instruction memory 54 delivers instructions via buses 68, 76, 70 to programmed logic array 60 for logical implementation according to the programmed logic relationships established in programmed logic array 60. Instructions may be delivered to computation section 62, therefore, via secondary instruction bus 72 or via secondary data bus 74. Results from computation section 62 may be delivered to data memory 56 via buses 74, 70 (in the case of partial solutions) for employment by later instruction steps or may be generated as outputs in a line 63.

Thus, instruction memory 54 is not employed to store a program, as is the case with prior art digital signal processing apparatus 10 described in connection with FIG. 1. Instruction memory 54 instead is now really a catalog of instructions drawn from by program counter 52 according to user-defined sequenced identifiers stored in sequencer 64 via input device 78. Such a provision of user-control provides higher-level programming capability than writing instructions in machine language as is required with digital signal processing apparatus 10 (FIG. 1).

One may characterize the higher-level instruction capability of digital signal processing apparatus 50 as providing "mid-level" instructions (i.e., functional instructions) in instruction memory 54 for use in a program. One skilled in the art will realize that additional mid-level instructions or "higher-level" instructions which control groupings of the sequences or groupings of the mid-level instructions can be provided by a sequencer tree, that is, a hierarchically arranged array of sequencers.

FIG. 3 is a schematic block diagram of an alternate embodiment of the present invention. In FIG. 3, a digital signal processing apparatus 150 is illustrated employing a sequencer tree which provides a higher-level instruction capability. Digital signal processing apparatus 150 includes an instruction memory 154 which includes a ROM section and a RAM section (not shown in detail in FIG. 3), a program counter 152, a data memory 156, and an execution unit 158 which includes a programmed logic array 160 and a computation section 162. Buses 168, 170, 172, 174, 176 interconnect the elements of digital signal processing apparatus 150 in substantially the same manner as described in connection with the similar bus structure illustrated in FIG. 2.

In the embodiment of the present invention illustrated in FIG. 3, a sequencer tree comprising an array of sequencers 180 is hierarchically arranged with a first tier of sequencers $S_{1,1}$, $S_{1,2}$, $S_{1,3}$, ... $S_{1n}$; a second tier of sequencers $S_{2,1}$, $S_{2,2}$, $S_{2,3}$, ... $S_{2,n}$; and an mth tier of sequencers $S_{m,1}$, $S_{m,2}$, $S_{m,3}$, ... $S_{m,n}$. Sequencer array 180 is thus hierarchically ordered from a lowest-order sequencer tier ($S_{1,n}$ series) to a highest-order tier ($S_{m,n}$ series). The various sequencer tiers are interconnected by a bus network 182 in a manner enabling a given respective sequencer of a given hierarchically-ordered sequencer tier to designate in its respective stored sequenced identifiers a stored sequenced identifier in any lower-order sequencer tier or may designate selected instructions of the library of instructions (i.e., turnkey routines) stored in instruction memory 154, in either the ROM section or the RAM section of instruction memory 154.

By such manner, "higher-level" instructions may be fashioned by selecting groupings of stored sequenced identifiers of lower-order sequencer sets which, in turn, may each themselves designate still lower-order stored sequenced identifiers.

As one skilled in the art will recognize, additions of greater numbers of higher level sequencer tiers will require higher clock speeds for first tier sequencers ($S_{1,n}$ series) in order to maintain operating speed for digital signal processing apparatus 150. In order to alleviate such a need for an increase in clock speed, one could provide additional execution units 158 (not shown in FIG. 3) and supporting units (i.e., program counter 152, instruction memory 154, data memory 156) for some or all of the first tier sequencers ($S_{1,n}$ series).

It is to be understood that, while the detailed drawing and specific examples given describe preferred embodiments of the invention, they are for the purpose of illustration, that the apparatus of the invention is not limited to the precise details and conditions disclosed and that various changes may be made therein without departing from the spirit of the invention which is defined by the following claims:

I claim:

1. A digital signal processing apparatus for executing a program, said program comprising an ordered schedule of instructions, the apparatus comprising:
   an instruction memory means for storing a predetermined library of instructions comprising a plurality of instructions identified by a plurality of addresses, each respective instruction in said library of instructions being identified by a respective address of said plurality of addresses;
   a sequencing means operatively connected with said instruction memory means for defining said program, said sequencing means being responsive to an input means for designating an appropriate set of said respective addressee to identify an appropriate set of said respective instructions to establish said ordered schedule appropriate to define said program; and
   an instruction executing means for executing said ordered schedule of instructions, said instruction executing means receiving said ordered schedule of instructions from said instruction memory means;
   said instruction memory means including a first instruction memory for storing instructions in a read only memory structure and a second instruction memory for storing instructions in a random access memory structure, said second memory being responsive to said input means to receive user-generated instructions directly from said input means for storage, said user-generated instructions being included in said library of instructions,
   said sequencing means recognizing a plurality of sequential codes, each respective sequential code of said plurality of sequential codes being associated with one said respective instruction of said library of instructions, said sequencing means receiving from said input means user-selected sequential codes of said plurality of sequential codes, said user-selected sequential codes designating said appropriate set of said respective addresses.

2. A digital signal processing apparatus as recited in claim 1 wherein the apparatus is embodied in an integrated structure.

3. A digital signal processing apparatus as recited in claim 1 wherein the apparatus is embodied in an integrated structure.

4. A digital signal processing apparatus for executing a program, the apparatus comprising:
   an instruction memory means for storing a plurality of predetermined instructions, each respective instruction of said plurality of instructions being uniquely amenable to retrieval;
   an instruction designating means operatively connected with said instruction memory means and responsive to user inputs for recording and storing identities of selected instructions of said plurality of instructions as program instructions, an ordered plurality of said program instructions comprising said program; and
   an executing means operatively connected with said instruction memory means for executing said program, said instruction memory means providing said program to said executing means for execution as directed by said instruction designating means;
   said instruction memory means including a first instruction memory for storing instructions in a read only memory structure and a second instruction memory for storing instructions in a random access memory structure, said second memory being responsive to said user inputs to receive user-generated instructions for storage, said user-generated instructions being included in said plurality of instructions,
   said instruction designating means recognizing a plurality of sequential codes, each respective sequential code of said plurality of sequential codes being associated with one said respective instruction of said plurality of predetermined instructions, said instruction designating means receiving from an input means user-selected sequential codes of said plurality of sequential codes, said user-selected sequential codes designating a respective set of said plurality of instruction.

5. A digital signal processing apparatus as recited in claim 4 wherein the apparatus is embodied in an integrated structure.

6. A digital signal processing apparatus for executing a program, the apparatus comprising:

an instruction memory means for storing a plurality of predetermined instructions, each respective instruction of said plurality of instructions being uniquely retrievable;

a plurality of sequence designating means responsive to user inputs for designating stored sequences, said plurality of sequence designating means being hierarchically arranged in sets of sequence designating means from a lowest-order set to a highest-order set, said plurality of sequence designating means being operatively connected with said instruction memory means; each respective sequence designating means of a given set of sequence designating means containing in its respective stored sequence a stored respective hierarchical sequence, each said respective hierarchical sequence being configured to designate any lower-order respective sequence designating means as a designated lower-order sequence designating means, said respective stored sequence of each said designated lower-order sequence designating means being included in said program, each said respective hierarchical sequence also being configured to designate selected instructions of said plurality of instructions as program instructions, said program instructions being included in said program; and an executing means operatively connected with said instruction memory means for executing said program, said instruction memory means providing said program to said executing means for execution as directed by said plurality of sequence designating means, wherein said instruction memory means includes a first instruction memory for storing instructions in a read only memory structure and a second instruction memory for storing instructions in a random access memory structure, said second memory being responsive to said user inputs to receive user-generated instructions for storage, said user-generated instructions being included in said plurality of instructions.

7. A digital signal processing apparatus as recited in claim 6 wherein the apparatus is embodied in an integrated structure.

8. A digital signal processing apparatus as recited in claim 6 wherein the apparatus is embodied in an integrated structure.

* * * * *